United States Patent
Zou et al.

(10) Patent No.: US 12,474,311 B2
(45) Date of Patent: Nov. 18, 2025

(54) METHOD FOR ESTABLISHING FINGERPRINT OF TRADITIONAL CHINESE MEDICINE COMPOUND OR ITS PREPARATION WITH IMPROVING COGNITION

(71) Applicants: Chenland Nutritionals, Inc., Irvine, CA (US); Qingdao Chenland Biological Technology Co., ltd., Qingdao (CN)

(72) Inventors: Shengcan Zou, Qingdao (CN); Shanglong Wang, Qingdao (CN); Xin Li, Qingdao (CN); Lei Zong, Qingdao (CN); Jiancheng Zong, Qingdao (CN); Zengliang Zhang, Qingdao (CN)

(73) Assignees: QINGDAO CHENLAND HEALTH INDUSTRY GROUP CO., LTD., Qingdao (CN); CHENLAND NUTRITIONALS, INC., Irvine, CA (US)

( * ) Notice: Subject to any disclaimer, the term of this patent is extended or adjusted under 35 U.S.C. 154(b) by 861 days.

(21) Appl. No.: 17/743,414

(22) Filed: May 12, 2022

(65) Prior Publication Data
US 2022/0326200 A1 Oct. 13, 2022

Related U.S. Application Data

(63) Continuation of application No. PCT/CN2019/126537, filed on Dec. 19, 2019.

(30) Foreign Application Priority Data

Nov. 14, 2019 (CN) .......................... 201911112565.8

(51) Int. Cl.
*G01N 30/86* (2006.01)
*A61K 35/00* (2006.01)
(Continued)

(52) U.S. Cl.
CPC ......... *G01N 30/8686* (2013.01); *A61K 35/00* (2013.01); *G01N 30/14* (2013.01); *G01N 2030/062* (2013.01)

(58) Field of Classification Search
None
See application file for complete search history.

(56) References Cited

FOREIGN PATENT DOCUMENTS

CN 1981852 A * 6/2007 ............. A61K 35/64

OTHER PUBLICATIONS

Yin, H.L. et al. Effects of curcumin on hippocampal expression of NgR and axonal regeneration in Aβ-induced cognitive disorder rats, Genetics and Molecular Research 13 (1): 2039-2047 (2014) (Year: 2014).*

(Continued)

*Primary Examiner* — Xiaoyun R Xu
(74) *Attorney, Agent, or Firm* — HOWARD M COHN and Associates, LLC

(57) ABSTRACT

A method for establishing fingerprint of traditional Chinese medicine compound or its preparation with improving cognition is disclosed. By weight, the traditional Chinese medicine compound is made from following raw materials: 1-20 parts of *Gastrodiae Rhizoma*, 1-15 parts of *Polygala tenuifolia*, 1-30 parts of *Acorus tatarinowii*, 0.1-10 parts of *Cistanche deserticola* Ma, 0.1-10 parts of *Rehmanniae Radix Praeparata*, and 0.01-1 parts of curcumin. A chromatogram of a test sample solution is established by high performance liquid chromatography. Chromatographic conditions are as follows: a chromatographic column is octadecyl silane bonded silica gel chromatographic column. A column temperature is 25~35 ° C. A flow rate is 0.9~ 1.1 ml/min. Detection wavelengths are 210~230 nm and (Continued)

310~330 nm respectively. A mobile phase A is acetonitrile and a mobile phase B is water. And gradient elution is carried out.

9 Claims, 8 Drawing Sheets

(51) Int. Cl.
*G01N 30/14* (2006.01)
*G01N 30/06* (2006.01)

(56) References Cited

OTHER PUBLICATIONS

Wu, D., et al. Quality analysis of Polygala tenuifolia root by ultrahigh performance liquid chromatography—tandem mass spectrometry and gas chromatography—mass spectrometry, Journal of Food and Drug Analysis, 23, 144-151 (Year: 2015).*

* cited by examiner

METHOD FOR ESTABLISHING FINGERPRINT OF TRADITIONAL CHINESE MEDICINE COMPOUND OR ITS PREPARATION WITH IMPROVING COGNITION

CROSS REFERENCE TO RELATED APPLICATION

This patent application is a continuation application of PCT/CN2019/126537, filed on Dec. 19, 2019, which claims the benefit and priority of Chinese Patent Application No. 201911112565.8, filed on Nov. 14, 2019, the disclosure of which is incorporated by reference herein in its entirety as part of the present application.

TECHNICAL FIELD

The present disclosure relates to the technical field of traditional Chinese medicine analysis, and more specifically, to a method for establishing fingerprint of traditional Chinese medicine compound or its preparation with improving cognition.

BACKGROUND ART

With the increasing trend of aging in the world year by year, mild cognitive impairment (MCI) and vascular cognitive impairment (VCI), as the transition state from normal aging to dementia, have attracted more and more attention. In developed countries, the mortality rate of Alzheimer's disease ranks fourth after heart disease, tumor and apoplexy. With the aging of the world population, the disease has become one of the most serious problems facing geriatrics. Mild cognitive impairment in the early stage of Alzheimer's disease is recognized as a highly prevalent and preventable syndrome. At present, there is no specific treatment for Alzheimer's patients. FDA approved drugs can improve the symptoms of dementia in a short time, but can not slow down the development of the disease. Actively carrying out the research, prevention and treatment of MCI and VCI is of great significance to improve the quality of life of patients.

Active intervention on mild cognitive impairment is an effective measure to delay the further decline of cognitive function, but there are few reports on the intervention measures of mild cognitive impairment, and there are only individual multicenter studies on drugs. Therefore, a systematic study on the treatment status and progress of mild cognitive impairment at home and abroad is carried out. Because the most common subtype of mild cognitive impairment is amnestic cognitive impairment, that is, the early stage of Alzheimer's disease, the intervention strategies for mild cognitive impairment mostly follow the treatment scheme of Alzheimer's disease.

Traditional Chinese medicine prescriptions such as heart-benefiting recipe and kidney-tonifying recipe can protect nerves and improve learning and memory. The deterioration of brain cognitive function is closely related to "kidney deficiency". Dementia will gradually occur in the year of kidney deficiency, lack of source of essence, loss of nourishment of medullary sea and loss of use of spiritual mechanism. At the same time, in old age, the viscera are weak and the physiological or pathological products cannot be eliminated in time, accumulate in the body, generate phlegm and blood stasis, and the phlegm covers the clear orifices and/or blocks the brain collaterals, so that the brain Qi is not connected with the organs, and the spiritual mechanism is out of use, leading to dementia. Clinical research shows that the symptoms of deficiency of kidney Qi, turbid phlegm covering orifices and obstruction of brain collaterals account for 97%, 78% and 76% respectively. The present disclosure provides a traditional Chinese medicine compound with improving cognition, which is made from following raw materials: 1-20 parts by weight of *Gastrodiae Rhizoma*, 1-15 parts by weight of *Polygola tenuifolia*, 1-30 parts by weight of *Acorus tatarinowii*, 0.1-10 parts by weight of *Cistanche deserticola* Ma, 0.1-10 parts by weight of *Rehmanniae Radix Praeparata*, and 0.01-1 parts by weight of curcumin.

Based on the systematic study of chemical components of traditional Chinese medicine, the single extract can be evaluated by using the fingerprint method of traditional Chinese medicine and quantifiable identification means. The quality of the control method is real, excellent and stable. Traditional Chinese medicine and its preparations are multi-component and complex systems. Therefore, the establishment of traditional Chinese medicine fingerprint can comprehensively reflect the types and quantities of chemical components contained in traditional Chinese medicine and its preparations, provide detection methods with rich identification information, and then describe and evaluate the quality of drugs as a whole, improve the quality of traditional Chinese medicine and promote the modernization of traditional Chinese medicine. At present, there is a lack of qualitative research on the compound system of traditional Chinese medicine formula to improve cognition. Therefore, it is necessary to establish the fingerprint of this traditional Chinese medicine formula compound, which can complete the qualitative analysis of this traditional Chinese medicine formula compound, so as to effectively control the quality of this traditional Chinese medicine formula compound.

SUMMARY

In view of the above, the present disclosure provides a method for establishing fingerprint of a traditional Chinese medicine compound or its preparation with improving cognition. The fingerprint obtained by the method for establishing the fingerprint can fully reflect the quality information of the traditional Chinese medicine compound, so as to achieve the purpose of more comprehensive and effective control of the product quality of the traditional Chinese medicine compound.

In order to achieve the above purpose, technical solutions of the present disclosure are specifically described as follows.

The present disclosure provides a method for establishing fingerprint of traditional Chinese medicine compound or its preparation with improving cognition. The traditional Chinese medicine compound is made from following raw materials: 1-20 parts by weight of *Gastrodiae Rhizoma*, 1-15 parts by weight of *Polygala tenuifolia*, 1-30 parts by weight of *Acorus tatarinowii*, 0.1.-10 parts by weight of *Cistanche deserticola* Ma, 0.1-10 parts by weight of *Rehmanniae Radix Praeparata*, and 0.01-1 parts by weight of curcumin.

A chromatogram of the test sample solution is established by high performance liquid chromatography. Chromatographic conditions are as follows: a chromatographic column is octadecyl silane bonded silica gel chromatographic column. A column temperature is 25~35° C. A flow rate is 0.9~1.1 ml/min. Detection wavelengths are 210~230 nm and 310~330 nm respectively. A mobile phase A is acetonitrile and a mobile phase B is water. And a gradient elution procedure is as follows:

| Time/min | Mobile phase A/% | Mobile phase B/% |
|---|---|---|
| 0.00~5.00 | 5 | 95 |
| 5.00~8.00 | 5→8 | 95→92 |
| 8.00~11.00 | 8 | 92 |
| 11.00~17.00 | 8→13 | 92→87 |
| 17.00~23.00 | 13 | 87 |
| 23.00~26.00 | 13→17 | 87→83 |
| 26.00~30.00 | 17 | 83 |
| 30.00~31.00 | 17→21.5 | 83→78.5 |
| 31.00~73.00 | 21.5→31 | 78.5→69 |
| 73.00~93.00 | 31→50 | 69→50 |
| 93.00~103.00 | 50→60 | 50→40 |
| 103.00~108 | 60→70 | 40→30 |
| 108.00~110.00 | 70→90 | 30→10 |
| 110.00~120.00 | 90 | 10 |

Preferably, the detection wavelengths are 220 mn and 320 nm respectively.

Preferably, the chromatographic column is InertSustain AQ-C18, and a specification is 4.6×250 mm, 5 μm.

Preferably, the column temperature is 30° C.

Preferably, the flow rate is 1.0 ml/min.

Preferably, a preparation method of the test sample solution is as follows. The traditional Chinese medicine compound or its preparation is taken and mixed with an acetonitrile aqueous solution, and a ratio of the traditional Chinese medicine compound or its preparation to the acetonitrile aqueous solution is (0.5~1.5): 50 in g/ml. Ultrasonic treatment and filtration are carried out, and a subsequent filtrate is obtained.

Preferably, a volume percentage concentration of the acetonitrile aqueous solution is 40% ~60%.

In the specific embodiments provided by the disclosure, the volume percentage concentration of the acetonitrile aqueous solution is 50%.

In the specific embodiments provided by the disclosure, the ratio of traditional Chinese medicine compound or its preparation to acetonitrile aqueous solution is 1:50 in g/ml.

In the specific embodiments provided by the disclosure, the duration of ultrasonic treatment is 40 min.

Preferably, the traditional Chinese medicine compound is made from following raw materials: 16-20 parts by weight of *Gastrodiae Rhizoma*, 10-14 parts by weight of *Polygala tenuifolia*, 16-20 parts by weight of *Acorus tatarinowii*, 5-7 parts by weight of *Cistanche deserticola* Ma, 5-7 parts by weight of *Rehmanniae Radix Praeparata*, and 0.05-0.15 parts by weight of curcumin.

In the specific embodiments provided by the disclosure, the traditional Chinese medicine compound is made from following raw materials: 18 parts by weight of *Gastrodiae Rhizoma*, 12 parts by weight of *Polygala tenuifolia*, 18 parts by weight of *Acorus tatarinowii*, 6 parts by weight of *Cistanche deserticola* Ma, 6 parts by weight of *Rehmanniae Radix Praeparata*, and 0.1 parts by weight of curcumin.

Preferably, a preparation method for the traditional Chinese medicine compound includes the following steps.

Ethanol extraction: heating and refluxing *Gastrodiae Rhizoma* and *Polygala tenuifolia* with ethanol aqueous solution, and collecting an ethanol extraction solution and an ethanol extraction residue.

Water extraction: heating and refluxing *Acorus tatarinowii* with water, and collecting *Acorus tatarinowii* solution, *Acorus tatarinowii* residue and *Acorus tatarinowii* volatile oil; heating and refluxing *Cistanche deserticola* Ma, *Rehmanniae Radix Praeparata*, the ethanol extraction residue, the *Acorus tatarinowii* residue with water, and collecting a water extraction solution.

Filtration and concentration: mixing the ethanol extraction solution, the *Acorus tatarinowii* solution and the water extraction solution to obtain a mixing solution, and filtrating and concentrating the mixing solution to obtain an extractum.

Encapsulation: mixing the *Acorus tatarinowii* volatile oil and curcumin, and obtaining micropellets by cyclodextrin encapsulating.

Mixing: mixing the extractum and the micropellets.

Preferably, in the ethanol extraction step, a volume percentage concentration of the ethanol aqueous solution is 50-80%. The ethanol aqueous solution is used in an amount of 8-20 times of the total weight of the *Gastrodiae Rhizoma* and the *Polygala tenuifolia*. A number of heating and refluxing is 1-5 times, 0.5-3 hours each time.

In the specific embodiments provided by the disclosure, in the ethanol extraction step, the ethanol aqueous solution is used in an amount of 10 times of the total weight of the *Gastrodiae Rhizoma* and the *Polygala tenuifolia*. The number of heating and refluxing is 3 times, 1 hour each time.

Preferably, in the water extraction step, 8-30 times the weight of water is added into the *Acorus tatarinowii* for heating and refluxing, and the number of the heating and refluxing is 1-3 times, 3-5 hours each time, and the *Acorus tatarinowii* solution, the *Acorus tatarinowii* residue and the *Acorus tatarinowii* volatile oil are collected. 8-30 times the total weight of medicinal materials of water is added into the *Acorus tatarinowii* solution, *Acorus tatarinowii* residue and *Acorus tatarinowii* volatile oil for heating and refluxing, the number of the heating and refluxing is 1-5 times, 0.5-3 hours each time, and the water extraction solution is collected.

In the specific embodiments provided by the disclosure, 14 times the weight of the water is added into the *Acorus tatarinowii* for heating and refluxing, and the number of heating and refluxing is once, 5 hours each time.

In the specific embodiments provided by the disclosure, in the water extraction step, 10 times the total weight of medicinal materials of water is added into the *Acorus tatarinowii* solution, *Acorus tatarinowii* residue and *Acorus tatarinowii* volatile oil for heating and refluxing, and the number of the heating and refluxing is twice, 1.5 hours each time.

Preferably, in the encapsulation step, a weight ratio of the mixture of the *Acorus tatarinowii* volatile oil and the curcumin to β-cyclodextrin is 1: (1-5). A grinding time during the encapsulation is 1-4 hours, and a drying temperature is 40-60° C.

In the specific embodiments provided by the disclosure, in the encapsulation step, a weight ratio of the mixture of the *Acorus tatarinowii* volatile oil and the curcumin to β-cyclodextrin is 1: 1.5. The grinding time during the encapsulation is 2 hours, and the drying temperature is 45° C.

The present disclosure provides a method for establishing fingerprint of traditional Chinese medicine compound or its preparation with improving cognition. The traditional Chinese medicine compound is made from following raw materials: 1-20 parts by weight of *Gastrodiae Rhizoma*, 1-15 parts by weight of *Polygala tenuifolia*, 1-30 parts by weight of *Acorus tatarinowii*, 0.1-10 parts by weight of *Cistanche deserticola* Ma, 0.1-10 parts by weight of *Rehmanniae Radix Praeparata*, and 0.01-1 parts by weight of curcumin. A chromatogram of a test sample solution is established by high performance liquid chromatography. Chromatographic conditions are as follows: a chromatographic column is octadecyl silane bonded silica gel chromatographic column; a column temperature is 25~35° C; a flow rate is 0.9~1.1 ml/min; detection wavelengths are 210~230 nm and 310~330 nm respectively; a mobile phase A is acetonitrile and a mobile phase B is water; and gradient elution is carried out. The disclosure has the following technical effects.

1. The fingerprint obtained by the method for establishing the fingerprint of the traditional Chinese medicine compound with improving cognition comprehensively reflects the quality information of the traditional Chinese medicine compound, so as to achieve the purpose of more comprehensively and effectively controlling the product quality of the traditional Chinese medicine compound.

2. The method for establishing the fingerprint of traditional Chinese medicine compound with improving cognition adopts the similarity evaluation system of traditional Chinese medicine chromatographic fingerprint provided by Chinese Pharmacopoeia Commission to identify the measured fingerprint, and the operation is convenient and fast. Moreover, the fingerprint of the preparation is evaluated by the obtained similarity results, and the conclusion is more objective and accurate.

DETAILED DESCRIPTION OF THE EMBODIMENTS

Figure 1:
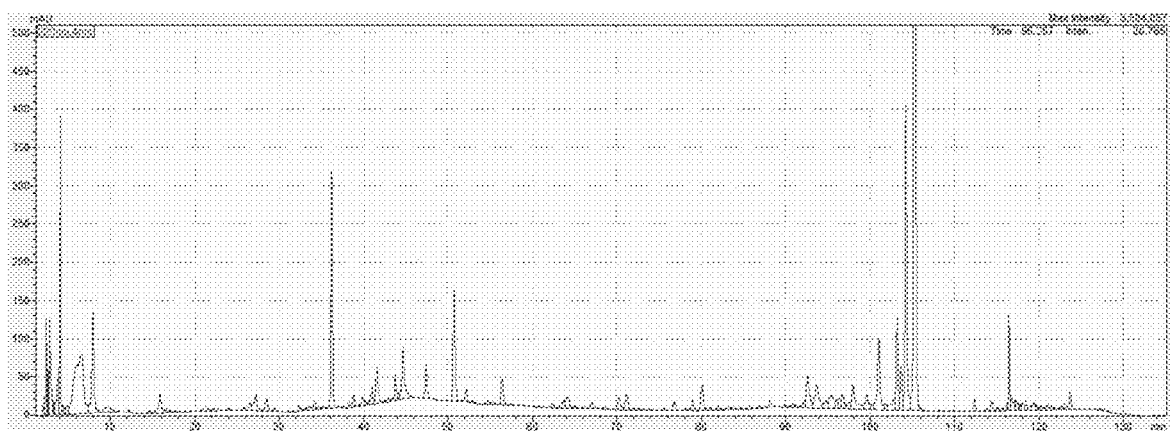
FIG. 1 shows the fingerprint of the traditional Chinese medicine compound of embodiment 1.

A method for establishing fingerprint of traditional Chinese medicine compound or its preparation with improving cognition is disclosed. Those skilled in the art can learn from the contents of the description and appropriately improve the process parameters to realize the method. In particular, it should be noted that all similar substitutions and modifications are obvious to those skilled in the art, and they are considered to be included in the present disclosure. The method and application of the disclosure have been described through preferred embodiments. It is obvious that relevant personnel can realize and apply the technology of the disclosure by changing or appropriately changing and combining the method and application described herein without departing from the content, spirit and scope of the disclosure.

The reagent or instrument used in the method for establishing fingerprint of traditional Chinese medicine compound or its preparation with improving cognition can be purchased from the market.

The disclosure is further described below combination with the embodiments.

Embodiment 1 Establishment of fingerprint of traditional Chinese medicine compound The traditional Chinese medicine compound and its preparation method is as follows.

1. The formula of this embodiment was:

*Gastrodiae Rhizoma* 18 g, *Polygala tenuifolia* 12 g, *Acorus tatarinowii* 18 g, *Cistanche deserticola* Ma 6 g, *Rehmanniae Radix Praeparata* 6 g, and curcumin 0.1 g, 2. The preparation method was as follows.

(1) *Gastrodiae Rhizoma* and *Polygala tenuifolia* were heated and refluxed with 10 times of 70% ethanol aqueous solution for 3 times, 1 hour each time, and the solution and residue were collected respectively.

(2) *Acorus tatarinowii* was heated and refluxed with 14 times of water once for 5 hours, and the solution, residue and volatile oil were collected.

(3) *Cistanche deserticola* Ma, *Rehmanniae Radix Praeparata*, the residue collected in steps (1) and (2) are heated and relaxed with 10 times of water twice for 1.5 hours each time, and the solution was collected.

(4) All the solution obtained in steps (1), (2) and (3) was filtrated and concentrated to obtain the extractum.

(5) The volatile oil obtained in step (2) and curcumin were mixed, and the micropellets were obtained by cyclodextrin encapsulating. The weight ratio of the mixture of the volatile oil and curcumin to 62-cyclodextrin was 1:1.5, the grinding time was 2 hours, and the drying temperature was 45° C.

(6) The extractum obtained in step (4) and the micropellets obtained in step (5) were mixed to obtain the traditional Chinese medicine compound.

3. Preparation of test sample 1 g of the compound was taken and suspended in 50 ml of 1:1 acetonitrile aqueous solution. The solution was subjected to ultrasonic treatment for 40 min and filtered with filter paper. Then the subsequent filtrate was taken and passed through 0.22 microporous filter membrane to obtain the compound sample.

4. Reference chromatographic conditions of fingerprint

Octadecyl bonded silica gel was used as a packing, and the model of chromatographic column is InertSustain AQ-C18 (4.6×250 mm , 5 μm). Acetonitrile was used as mobile phase A and water was used as mobile phase B. Gradient elution was carried out as specified in the following table. The column temperature was 30° C. and the flow rate was 1 mL/min. The detection wavelengths were 220 nm and 320 nm.

TABLE 1

Elution gradient procedure

| Time (min) | Mobile phase A (%) | Mobile phase B (%) |
|---|---|---|
| 0.00~5.00 | 5 | 95 |
| 5.00~8.00 | 5→8 | 95→92 |
| 8.00~11.00 | 8 | 92 |
| 11.00~17.00 | 8→13 | 92→87 |
| 17.00~23.00 | 13 | 87 |
| 23.00~26.00 | 13→17 | 87→83 |
| 26.00~30.00 | 17 | 83 |
| 30.00~31.00 | 17→21.5 | 83→78.5 |
| 31.00~73.00 | 21.5→31 | 78.5→69 |
| 73.00~93.00 | 31→50 | 69→50 |
| 93.00~103.00 | 50→60 | 50→40 |
| 103.00~108 | 60→70 | 40→30 |
| 108.00~110.00 | 70→90 | 30→10 |
| 110.00~120.00 | 90 | 10 |

10 μL of the sample was injected to obtain the spectrum, as shown in FIG. 1.

According to the requirements of fingerprint, 13 chromatographic peaks with good resolution and large content were selected as characteristic peaks. They were successively labeled as peaks 1-13, and their retention times were 27.30, 28.56, 36.18, 43.70, 44.67, 47.37, 50.57, 56.32, 70.08, 71.00, 79.94, 100.89 and 105.195 respectively. The peak areas were 462683, 466606, 5751435, 1019754, 2121885, 1037280, 4017599, 837200, 450411, 571265, 950998, 1003678 and 11177198 respectively.

Embodiment 2 Establishment of fingerprint of *Acorus tatarinowii* extract

The preparation method of *Acorus tatarinowii* extract is as follows.

100 g of *Acorus tatarinowii* was taken and soaked for 3 hours. The soaked *Acorus tatarinowii* was heated, refluxed and extracted with 8 times water for 3 times, 2 h, 2 h and 1.5 h each time. The extracts were combined, filtered, concentrated and dried to obtain the *Acorus tatarinowii* extract.

1.00 g of *Acorus tatarinowii* extract was precisely weighed and 20 ml of 50% acetonitrile solution was precisely added. The solution was subjected ultrasonic extraction for 40 min and filtered with filter paper to obtain a subsequent filtrate. The subsequent filtrate was passed through 0.22 microporous filter membrane to obtain a subsequent filtrate, that is, the sample of *Acorus tatarinowii* extract.

Reference chromatographic conditions of fingerprint of the *Acorus tatarinowii* extract: octadecyl bonded silica gel was used as a packing, and the model of chromatographic column is InertSustain AQ-C18 (4.6×250 mm , 5 μm). Acetonitrile was used as mobile phase A and water was used as mobile phase B. Gradient elution was carried out as specified in the Table 1. The column temperature was 30° C. and the flow rate was 1 mL/min. The detection wavelength was 220 nm.

Figure 2:
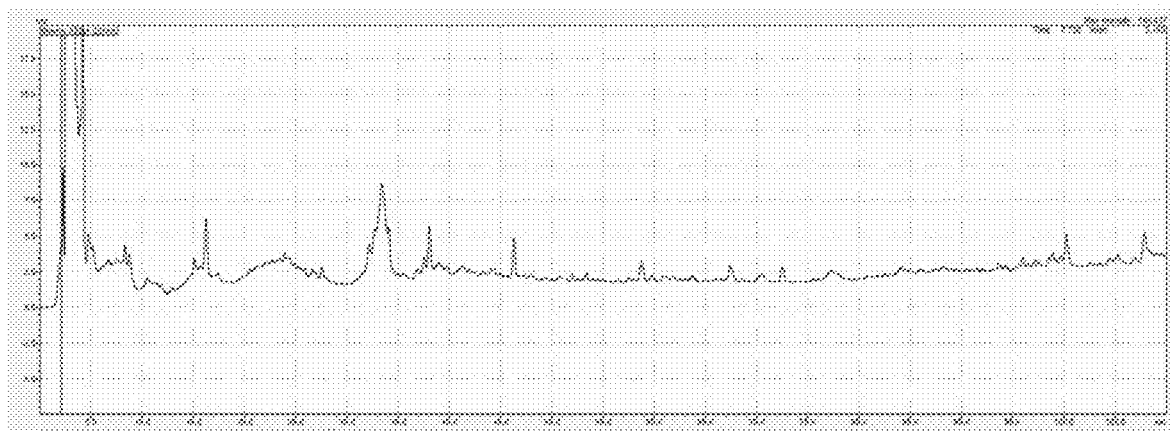
FIG. 2 shows the fingerprint of *Acorus tatarinowii* extract in embodiment 2.

10 μL of the sample was injected to obtain the spectrum, as shown in FIG. 2.

According to the requirements of fingerprint, four chromatographic peaks with good resolution and large content were selected as characteristic peaks. They were labeled as peaks 1-4, and their retention times were 46.28, 58.77, 67.45 and 72.52 respectively. The peak areas are 52868, 32769, 30682 and 25271 respectively.

Embodiment 3 Establishment of fingerprint of *Polygala tenuifolia* extract

The preparation method of *Polygala tenuifolia* extract is as follows.

The *Polygala tenuifolia* was heated, refluxed and extracted with 80% ethanol aqueous solution for 3 times, 2 hours each time. The ratio of liquid to material was 8 times, 8 times and 6 times respectively. The extracts were combined, filtered, concentrated and dried to obtain *Polygala tenuifolia* extract.

1.00 g of *Polygala tenuifolia* extract was precisely weighed and 20 ml of 50% acetonitrile solution was precisely added. The solution was subjected ultrasonic extraction for 40 min and filtered with filter paper to obtain a subsequent filtrate. The subsequent filtrate was passed through 0.22 microporous filter membrane to obtain a subsequent filtrate, that is, the sample of *Polygala tenuifolia* extract.

Reference chromatographic conditions of fingerprint of the *Polygala tenuifolia* extract: octadecyl bonded silica gel was used as a packing, and the model of chromatographic column is InertSustain AQ-C18 (4.6×250 mm , 5 μm). Acetonitrile was used as mobile phase A and water was used as mobile phase B. Gradient elution was carried out as specified in the Table 1. The column temperature was 30° C. and the flow rate was 1 mL/min. The detection wavelength was 280 nm.

Figure 3:
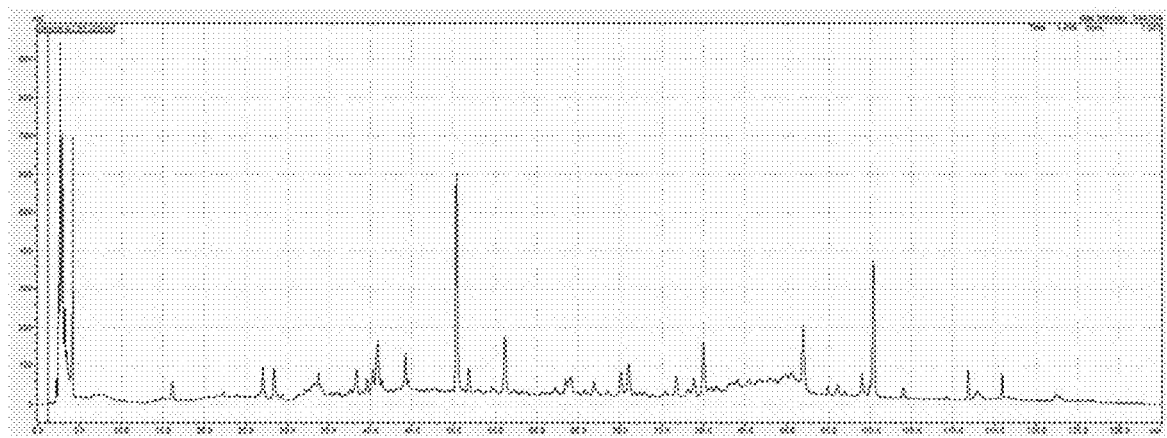
FIG. 3 shows the fingerprint of *Polygala tenuifolia* extract in embodiment 3.

10 μL of the sample was injected to obtain the spectrum, as shown in FIG. 3.

According to the requirements of fingerprint, seven chromatographic peaks with good resolution and large content were selected as characteristic peaks. They were labeled as peaks 1-7, and their retention times were 27.05, 28.38, 50.34, 51.81, 56.15, 70.08 and 71.01 respectively. The peak areas are 1960057, 1448764, 10550417, 1685443, 3468449, 1390382 and 1978811 respectively, Comparative example 1 Establishment of fingerprint of traditional Chinese medicine compound The only difference from the method of embodiment 1 was that the elution gradient of the mobile phase is different.

1 g of the compound (without curcumin) was taken and suspended in 20 ml of 1:1 acetonitrile aqueous solution. The solution was subjected to ultrasonic treatment for 40 min and filtered with filter paper. Then the subsequent filtrate was taken and passed through 0.22 microporous filter membrane to obtain a subsequent filtrate, that is, the compound sample.

Reference chromatographic conditions of fingerprint of the compound: octadecyl bonded silica gel was used as a packing, and the model of chromatographic column is InertSustain AQ-C18 (4.6×250 mm, 5 μm). Acetonitrile was used as mobile phase A and water was used as mobile phase B. Gradient elution was carried out as specified in the following table. The column temperature was 30° C. and the flow rate was 1 mL/min. The detection wavelength was 220 nm.

TABLE 2

| Elution gradient procedure | | |
| --- | --- | --- |
| Time (min) | Mobile phase A (%) | Mobile phase B (%) |
| 0.00~5.00 | 5 | 95 |
| 5.00~8.00 | 5→8 | 95→92 |
| 8.00~11.00 | 8 | 92 |
| 11.00~19.00 | 8→15 | 92→85 |
| 19.00~23.00 | 15 | 85 |
| 23.00~26.00 | 15→18 | 85→82 |
| 26.00~30.00 | 18 | 82 |
| 30.00~38.00 | 18→23.5 | 82→76.5 |
| 38.00~68.00 | 23.5→31 | 76.5→69 |
| 68.00~88.00 | 31→50 | 69→50 |
| 88.00~93.00 | 50→60 | 50→40 |
| 93.00~100 | 60→70 | 40→30 |
| 100.00~110.00 | 70→90 | 30→10 |
| 110.00~120.00 | 90→90 | 10→10 |

Figure 4:
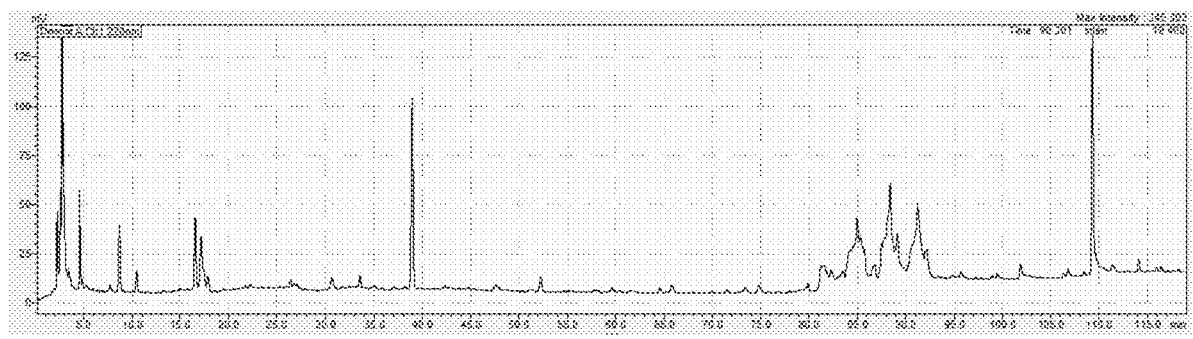
FIG. 4 shows the fingerprint of the traditional Chinese medicine compound of comparative example 1.

10 μL of the sample was injected to obtain the spectrum, as shown in FIG. 4.

As can he seen from FIG. 4, in the non-optimized comparative example 1, the main peaks cannot be successfully separated, and only a few peaks have high resolution, which can be used as a reference for fingerprint peaks. In the optimized embodiment 1, 13 peaks were well separated, meeting the requirements of fingerprint.

Comparative example 2 Establishment of fingerprint of traditional Chinese medicine compound The only difference from the method of embodiment 1 was that the detection wavelength of fingerprint is different.

1 g of the compound was taken and suspended in 50 ml of :1:1 acetonitrile aqueous solution. The solution was subjected to ultrasonic treatment for 40 min and filtered with filter paper. Then the subsequent filtrate was taken and passed through 0.22 microporous filter membrane to obtain a subsequent filtrate, that is, the compound sample.

Reference chromatographic conditions of fingerprint of the compound: octadecyl bonded silica gel was used as a packing, and the model of chromatographic column is InertSustain AQ-C18 (4.6×250 mm, 5 82 m). Acetonitrile was used as mobile phase A and water was used as mobile phase B. Gradient elution was carried out as specified in the following table. The column temperature was 30° C. and the flow rate was 1 mL/min. The detection wavelength was 360 nm.

TABLE 3

Elution gradient procedure

| Time (min) | Mobile phase A (%) | Mobile phase B (%) |
|---|---|---|
| 0.00~5.00 | 5 | 95 |
| 5.00~8.00 | 5→8 | 95→92 |
| 8.00~11.00 | 8 | 92 |
| 11.00~17.00 | 8→13 | 92→87 |
| 17.00~23.00 | 13 | 87 |
| 23.00~26.00 | 13→7 | 87→83 |
| 26.00~30.00 | 17 | 83 |
| 30.00~31.00 | 17→21.5 | 83→78.5 |
| 31.00~73.00 | 21.5→31 | 78.5→69 |
| 73.00~93.00 | 31→50 | 69→50 |
| 93.00~103.00 | 50→60 | 50→40 |
| 103.00~108 | 60→70 | 40→30 |
| 108.00~110.00 | 70→90 | 30→10 |
| 110.00~120.00 | 90 | 10 |

Figure 5:
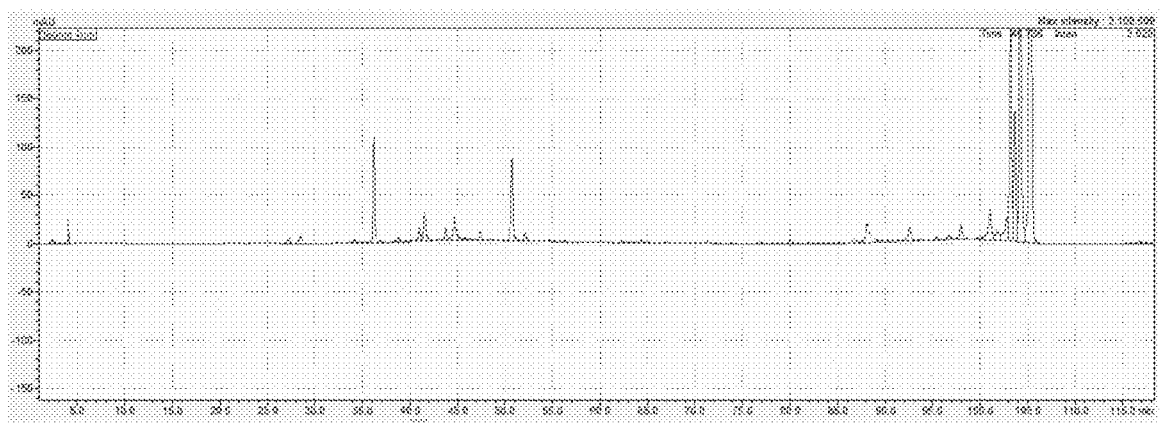
FIG. 5 shows the fingerprint of the traditional Chinese medicine compound of comparative example 2.
Figure 6:
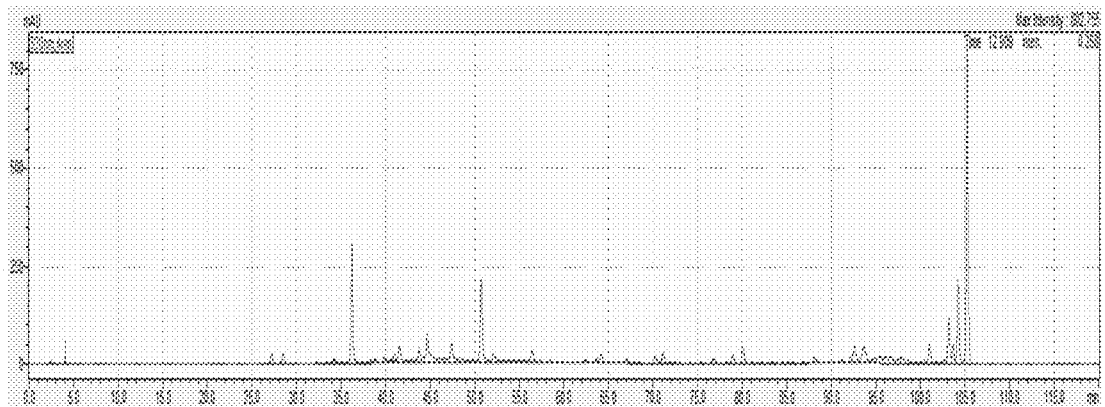
FIG. 6 shows the fingerprint of the traditional Chinese medicine compound of embodiment 4.
Figure 7:
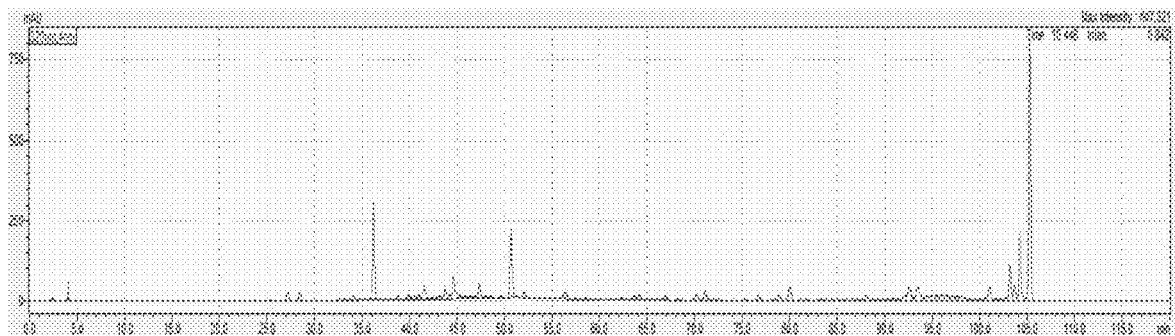
FIG. 7 shows the fingerprint of the traditional Chinese medicine compound of embodiment 4.
Figure 8:
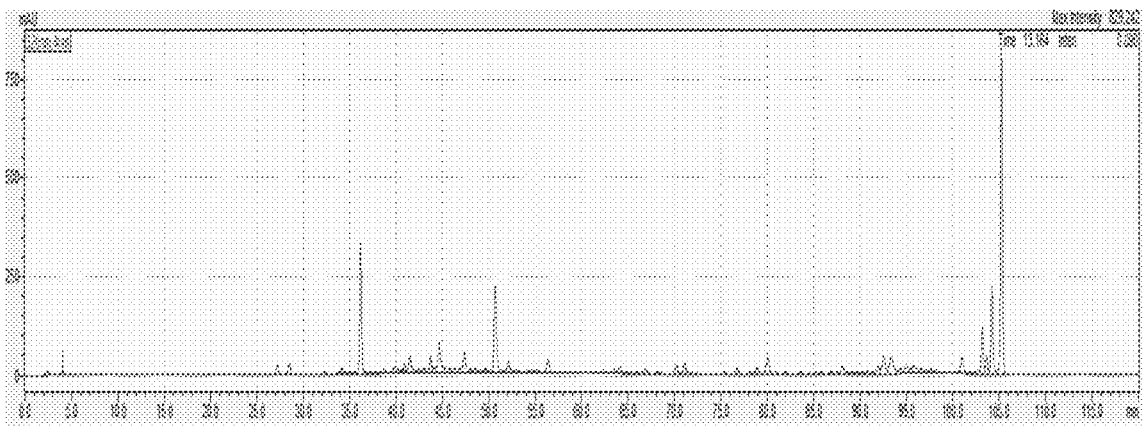
FIG. 8 shows the fingerprint of the traditional Chinese medicine compound of embodiment 4.

10 μL of the sample was injected to obtain the spectrum, as shown in FIG. 5.

As shown in FIG. 5, when the wavelength exceeds the range given in the claims, the absorption signal decreases and the peak area decreases, which can not show a good fingerprint effect.

Embodiment 4 Stability of fingerprint of traditional Chinese medicine compound

TABLE 4

Retention time and peak area of 3 batches of traditional Chinese medicine compounds

| Number | Retention time | | | Peak area | | |
|---|---|---|---|---|---|---|
| Sample | 1 | 2 | 3 | 1 | 2 | 3 |
| 1 | 27.212 | 27.190 | 27.192 | 473272 | 453871 | 467598 |
| 7 | 28.494 | 28.477 | 28.478 | 446864 | 449603 | 473331 |
| 3 | 36.202 | 36.176 | 36.162 | 4839504 | 405537 | 524446 |
| 4 | 43.742 | 43.716 | 43.704 | 786552 | 680161 | 832888 |
| 5 | 44.677 | 44.652 | 44.640 | 1929702 | 1385942 | 1612631 |
| 6 | 47.384 | 47.362 | 47.343 | 1266923 | 940715 | 1225406 |
| 7 | 50.713 | 50.699 | 50.680 | 3798456 | 3367319 | 3957070 |
| 8 | 56.390 | 56.373 | 56.365 | 717706 | 582951 | 630019 |
| 9 | 70.233 | 70.191 | 70.190 | 446604 | 449795 | 461420 |
| 10 | 71.137 | 71.094 | 71.096 | 548771 | 561297 | 573177 |
| 11 | 78.951 | 78.921 | 78.912 | 938141 | 957758 | 986231 |
| 12 | 101.016 | 101.016 | 101.010 | 919247 | 965832 | 821348 |
| 13 | 105.258 | 105.246 | 105.253 | 11269772 | 11333936 | 11610040 |

Similarity formula:

$$S = \frac{\sum_{i=1}^{n}(Xbj - \overline{Xb})(Xsj - \overline{Xs})}{\sqrt{\sum_{i=1}^{n}(Xbj - \overline{Xb})^2}\sqrt{\sum_{i=1}^{n}(Xsj - \overline{Xs})^2}}$$

Where, S is the fingerprint similarity, n is the number of fingerprint peaks, the peak area of the j-th fingerprint peak of the fingerprint of the mixed extract, the average area of the fingerprint peak of the fingerprint of the mixed extract, the area of the j-th fingerprint peak of the fingerprint of the standard extract, and the average area of the fingerprint peak of the fingerprint of the standard extract.

According to the similarity formula, the similarity is 0.9982 compared with that in embodiment 1, and the composite specified S should be greater than or equal to 0.9. And the retention time deviation is less than or equal to 0.2 min. It shows that the fingerprint method is stable and feasible.

The above is only the preferred embodiments of the disclosure. It should be pointed out that for ordinary technicians in the technical field, several improvements and refinements can be made without departing from the principles of the disclosure, and these improvements and refinements should also be regarded as the protection scope of the disclosure.

What is claimed is:

1. A method for establishing fingerprint of traditional Chinese medicine compound or its preparation with improving cognition, wherein the traditional Chinese medicine compound is made from following raw materials: 1-20 parts by weight of *Gastrodiae Rhizoma*, 1-15 parts by weight of *Polygala tenuifolia*, 1-30 parts by weight of *Acorus tatarinowii*, 0.1-10 parts by weight of *Cistanche deserticola* Ma, 0.1-10 parts by weight of *Rehmanniae Radix Praeparata*, and 0.01-1 parts by weight of curcumin;

a chromatogram of a test sample solution is established by high performance liquid chromatography, chromatographic conditions are as follows: a chromatographic column is octadecyl silane bonded silica gel chromatographic column; a column temperature is 25~35° C.; a flow rate is 0.9~1.1 ml/min; detection wavelengths are 210~230 nm and 310~330 nm respectively; a mobile phase A is acetonitrile and a mobile phase B is water; and a gradient elution procedure is as follows:

| Time/min | Mobile phase A/% | Mobile phase B/% |
|---|---|---|
| 0.00~5.00 | 5 | 95 |
| 5.00~8.00 | 5→8 | 95→92 |
| 8.00~11.00 | 8 | 92 |
| 11.00~17.00 | 8→13 | 92→87 |

-continued

| Time/min | Mobile phase A/% | Mobile phase B/% |
| --- | --- | --- |
| 17.00~23.00 | 13 | 87 |
| 23.00~26.00 | 13→17 | 87→83 |
| 26.00~30.00 | 17 | 83 |
| 30.00~31.00 | 17→21.5 | 83→78.5 |
| 31.00~73.00 | 21.5→31 | 78.5→69 |
| 73.00~93.00 | 31→50 | 69→50 |
| 93.00~103.00 | 50→60 | 50→40 |
| 103.00~108 | 60→70 | 40→30 |
| 108.00~110.00 | 70→90 | 30→10 |
| 110.00~120.00 | 90 | 10 | wherein a preparation method of the test sample solution is as follows: taking the traditional Chinese medicine compound or its preparation, mixing it with an acetonitrile aqueous solution, wherein a ratio of the traditional Chinese medicine compound or its preparation to the acetonitrile aqueous solution is (0.5~1.5):50 in g/ml; performing an ultrasonic treatment; filtering and taking a subsequent filtrate.

2. The method of claim 1, wherein the detection wavelengths are 220 nm and 320 nm respectively.

3. The method of claim 1, wherein the chromatographic column is InertSustain AQ-C18, and a specification is 4.6× 250 mm, 5 μm.

4. The method of claim 1, wherein the column temperature is 30° C.

5. The method of claim 1, wherein the flow rate is 1.0 ml/min.

6. The method of claim 1, wherein a volume percentage concentration of the acetonitrile aqueous solution is 40%~60%.

7. The method of claim 1, wherein the traditional Chinese medicine compound is made from following raw materials: 16-20 parts by weight of *Gastrodiae Rhizoma*, 10-14 parts by weight of *Polygala tenuifolia*, 16-20 parts by weight of *Acorus tatarinowii*, 5-7 parts by weight of *Cistanche deserticola* Ma, 5-7 parts by weight of *Rehmanniae Radix Praeparata*, and 0.05-0.15 parts by weight of curcumin.

8. The method of claim 1, wherein a preparation method for the traditional Chinese medicine compound comprises the following steps:

ethanol extraction: heating and refluxing *Gastrodiae Rhizoma* and *Polygala tenuifolia* with ethanol aqueous solution, and collecting an ethanol extraction solution and an ethanol extraction residue;

water extraction: heating and refluxing *Acorus tatarinowii* with water, and collecting *Acorus tatarinowii* solution, *Acorus tatarinowii* residue and *Acorus tatarinowii* volatile oil; heating and refluxing *Cistanche deserticola* Ma, *Rehmanniae Radix Praeparata*, the ethanol extraction residue, the Acorus tatarinowii residue with water, and collecting a water extraction solution;

filtration and concentration: mixing the ethanol extraction solution, the *Acorus tatarinowii* solution and the water extraction solution to obtain a mixing solution, and filtrating and concentrating the mixing solution to obtain an extractum;

encapsulation: mixing the *Acorus tatarinowii* volatile oil and curcumin, and obtaining micropellets by cyclodextrin encapsulating; and mixing: mixing the extractum and the micropellets.

9. The method of claim 8, wherein in the ethanol extraction step, a volume percentage concentration of the ethanol aqueous solution is 50-80%; the ethanol aqueous solution is used in an amount of 8-20 times of the total weight of the *Gastrodiae Rhizoma* and the *Polygala tenuifolia*; a number of heating and refluxing is 1-5 times, 0.5-3 hours each time;

in the water extraction step, 8-30 times the weight of water is added into the *Acorus tatarinowii* for heating and refluxing, and a number of the heating and refluxing is 1-3 times, 3-5 hours each time, and the *Acorus tatarinowii* solution, the *Acorus tatarinowii* residue and the *Acorus tatarinowii* volatile oil are collected; 8-30 times the total weight of medicinal materials of water is added into the *Acorus tatarinowii* solution, *Acorus tatarinowii* residue and *Acorus tatarinowii* volatile oil for heating and refluxing, a number of the heating and refluxing is 1-5 times, 0.5-3 hours each time, and the water extraction solution is collected; and in the encapsulation step, a weight ratio of the mixture of the *Acorus tatarinowii* volatile oil and the curcumin to β-cyclodextrin is 1:(1-5); a grinding time during the encapsulation is 1-4 hours, and a drying temperature is 40-60° C.

* * * * *